United States Patent [19]

Jacoby et al.

[11] Patent Number: 4,718,350
[45] Date of Patent: Jan. 12, 1988

[54] SMALL LIGHTWEIGHT DRIVERLESS VEHICLE

[75] Inventors: Charles E. Jacoby, Bethlehem; Per E. Lindqvist, Easton, both of Pa.

[73] Assignee: SI Handling Systems, Inc., Easton, Pa.

[21] Appl. No.: 328,271

[22] Filed: Dec. 7, 1981

[51] Int. Cl.⁴ .............................................. B61B 13/12
[52] U.S. Cl. .................................... 104/166; 104/247
[58] Field of Search ............... 104/118, 165, 166, 247; 74/89, 25

[56] References Cited

U.S. PATENT DOCUMENTS

| | | | |
|---|---|---|---|
| 3,690,267 | 9/1972 | Sutton | 104/165 |
| 3,759,403 | 9/1973 | Fernstrom | 104/247 X |
| 3,818,837 | 6/1974 | Jacoby et al. | 104/166 |
| 3,861,322 | 1/1975 | Danly | 104/166 |
| 3,929,079 | 12/1975 | Eliassen | 104/247 X |
| 4,054,215 | 10/1977 | Kurahashi | 104/166 X |
| 4,338,864 | 7/1982 | Ziegenfus | 104/166 X |
| 4,347,792 | 9/1982 | Nagahori | 104/166 |

Primary Examiner—Randolph Reese
Attorney, Agent, or Firm—Siedel, Gonda, Goldhammer & Abbott

[57] ABSTRACT

A driverless vehicle is provided with support wheels on one side and drive wheels on the opposite side. The drive wheels perform the dual function of supporting one side of the body and propelling the vehicle by frictional contact with a drive shaft. The drive wheels are coupled together for oscillation about a vertical axis and are biased to a drive position. The vehicle body is provided with a cam for causing accumulation upon contact with another vehicle.

15 Claims, 4 Drawing Figures

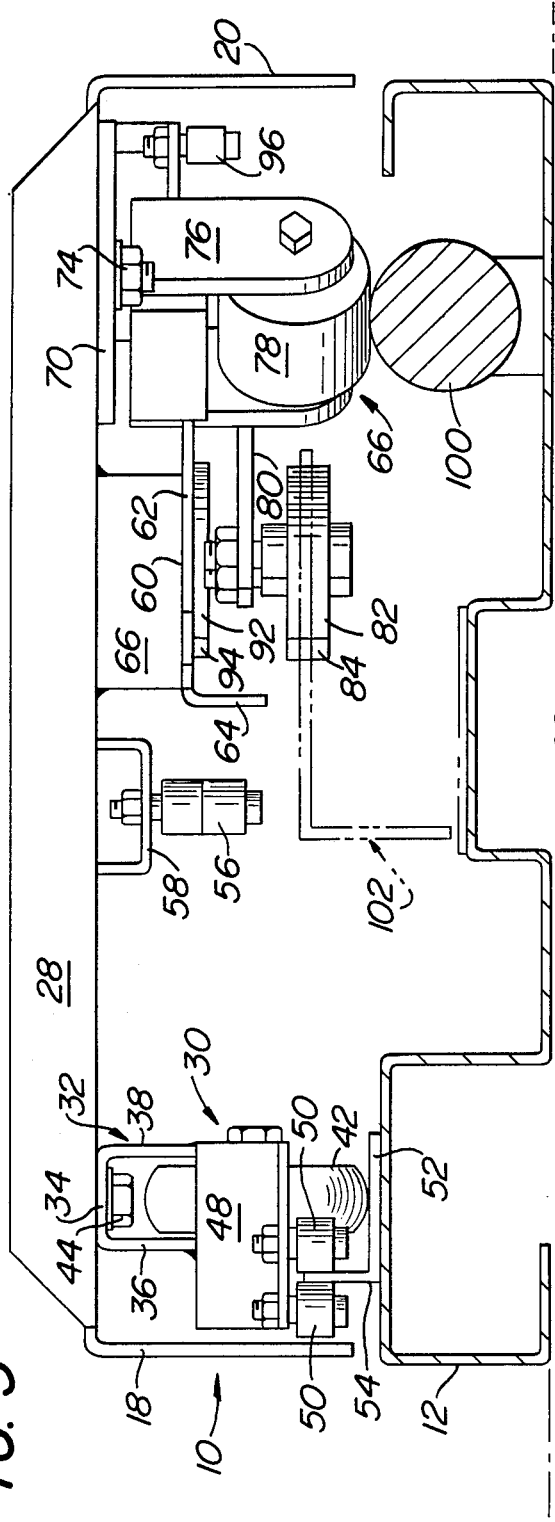
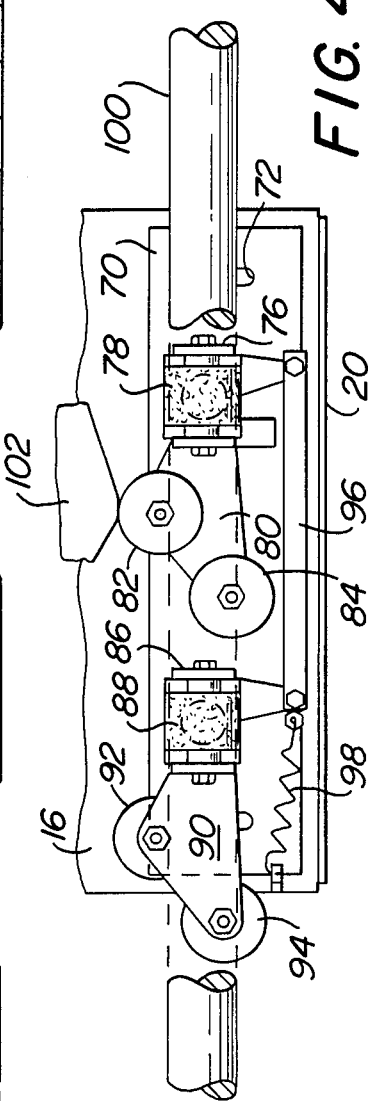
FIG. 3
FIG. 4

SMALL LIGHTWEIGHT DRIVERLESS VEHICLE

BACKGROUND

Miniaturization of driverless vehicles which can stop within a short distance create complex design problems so that the components do not interfere with one another. Because all parts are not miniaturized to the same degree, it is necessary to analyze what is needed and what can be eliminated from present driverless vehicles. As a result thereof, the vehicle must be redesigned so as to orientate components so that they may perform their intended function in a reliable manner without creating manufacturing problems in assembly of the vehicle.

There is a need for a lightweight, inexpensive driverless vehicle for carrying light loads of less than about 100 kilograms. The vehicle deck should be small so that the deck is in the range of 1500–5000 square centimeters. The vehicle should be capable of stopping over a short distance such as 20–22 centimeters for purposes of traffic control and/or accumulation. Accumulation refers to speed control of a moving vehicle which stops due to contact with another vehicle which is stationary and without causing a collision between the vehicles. Traffic controls relates to stopping or slowing down of a vehicle at a predetermined location along a track for any desired purpose such as performing work on the payload supported by the deck.

The present invention is directed to a solution of the above problems of how to make a vehicle small, lightweight and having the other attributes described above.

SUMMARY OF THE INVENTION

The invention is directed to a driverless vehicle having a body with opposite sides extending between a front end and a rear end. First and second sets of wheels are provided on the opposite sides for supporting the body so that a deck portion of the body is horizontally disposed. A cam means projects from one end of the body for causing accumulation in a manner whereby the body will not collide with another body upon contact therewith.

The first set of wheels are support wheels. The second set of wheels are drive wheels coupled together for oscillation about a vertical axis. The drive wheels are biased to a drive position. Each drive wheel has a bracket supporting at least one cam follower. The drive wheels are adapted to perform the dual function of supporting its side of the body and for propelling the body by frictional contact with a drive wheel.

It is an object of the present invention to provide a lightweight inexpensive vehicle for carrying light loads and capable of being stopped over a short distance for traffic control and/or accumulation.

It is another object of the present invention to provide a lightweight small driverless vehicle wherein components thereof are orientated in a manner so as to enable the vehicle to perform without interference between components thereof.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a vehicle in accordance with the present invention superimposed over a track forming part of an endless conveyor.
FIG. 2 is a bottom plan view of the vehicle.
FIG. 3 is a rear end view of the vehicle.
FIG. 4 is a partial bottom plan view of the vehicle showing the vehicle in a stop position for purposes of traffic control.

DETAILED DESCRIPTION

Figure 1:
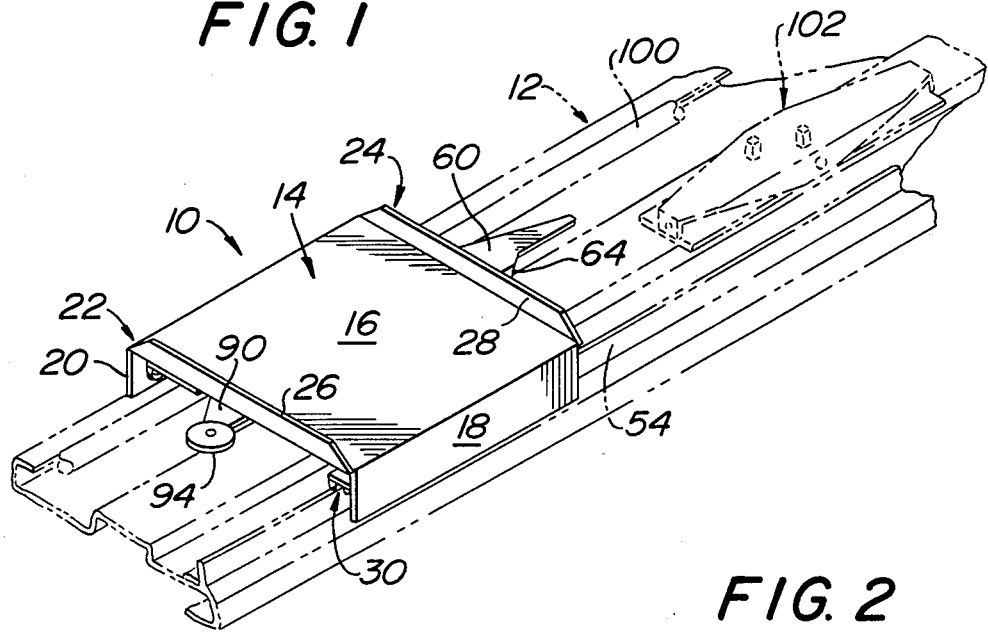

Referring to the drawings in detail, wherein like numerals indicate like elements, there is shown in FIG. 1 a driverless vehicle in accordance with the present invention designated generally as 10. The vehicle 10 is illustrated in FIG. 1 mounted on a track designated generally as 12. Track 12 forms part of an endless conveyor system and is horizontally disposed.

The vehicle 10 includes a body 14 of sheet metal bent into a U-shape so as to have a horizontally disposed deck 16 portion with depending side walls 18, 20 on opposite sides thereof. The vehicle 10 has a front end 22 and a rear end 24. The length of the body 14 is greater than the length of the side walls so as to provide material which may be bent into a vertical disposition at the front and rear ends thereof thereby defining the flanges 26 and 28. Flanges 26 and 28 provide reinforcement for the sheet metal whereby the deck portion 16 will not droop in the center portion thereof when supporting lightweight loads not exceeding 100 kilograms. A suitable thickness for low carbon steel for forming the body 14 is 0.012 inches.

The body 14 has a deck portion 16 which is less than 5000 square centimeters and preferably in the range of 1500–2500 square centimeters. Any suitable jig or fixture may be attached to the top surface of deck portion 16 to facilitate supporting any type of load such as a subassembly to be machined or worked on along a production line.

Figure 2:
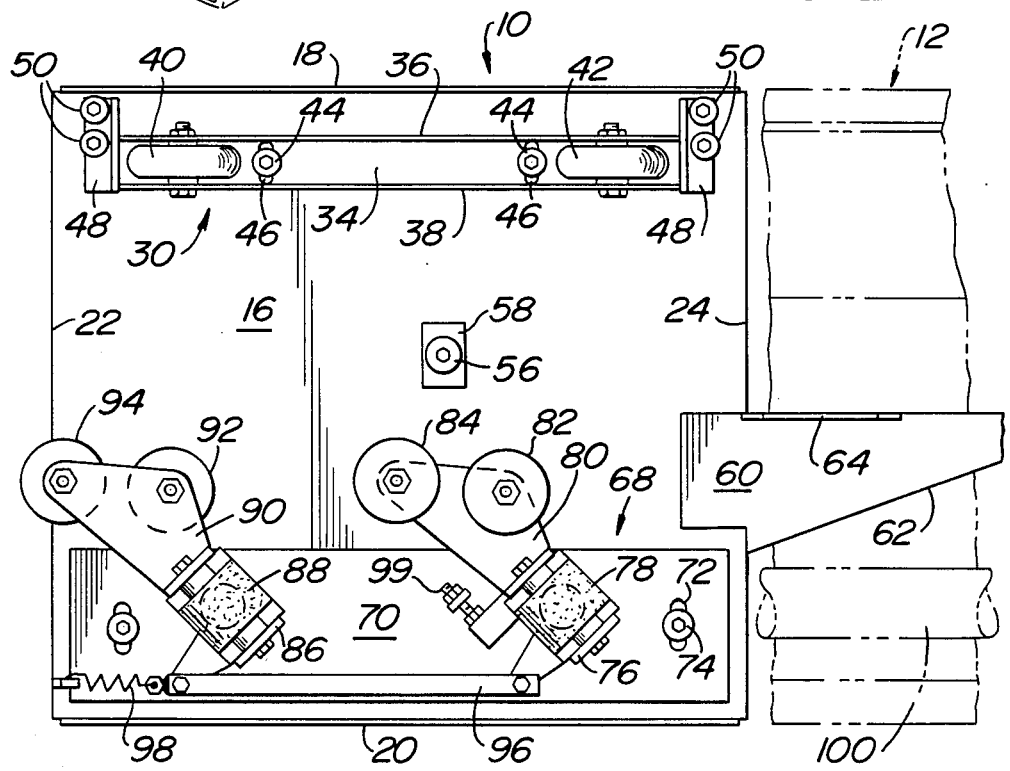

Referring to FIGS. 2 and 3, a support wheel assembly 30 is secured to a bottom surface on the deck portion 16 adjacent to the side wall 18. The assembly 30 includes a channel 32 having a bight portion 34 from which depend side walls 36, 38. Support wheels 40 and 42 are aligned and rotatably supported by the walls 36, 38.

A pair of studs are welded to the bottom surface of the deck portion 16. The bight portion 34 is provided with tranverse slots 46 and through which the studs extend. A nut 44 overlies the bight portion 34 and is threaded to the studs. The slots 46 facilitate adjustment of the assembly 30 toward and away from the side wall 18 so as to properly locate the pair of guide rollers 50 at each end of the assembly 30. Each set of guide rollers 50 is supported by an angle bracket 48 attached to the ends of walls 36, 38. Guide rollers 50 embrace opposite sides of an upstanding flange 54 on a rail 52. Rail 52 is secured to the top surface of track 12 along one side edge as shown more clearly in FIG. 3. The support wheel assembly 30 is preferably preassembled so that it may be rapidly attached to the studs depending from the deck portion 16 and thereby minimize assembly time.

A limit stop 56 is fixedly secured to a bottom surface of the deck portion 16 and depends therefrom by way of a mounting bracket 58. See FIGS. 2 and 3. Limit stop 56 is preferably comprised of one or more rollers which rotate about a vertical axis and is adapted to contact mating structure on a traffic control device.

An accumulation cam 60 is secured to the bottom surface of the deck portion 16 by way of a bracket 66 whereby the cam 60 will have its cam surface 62 at a predetermined elevation. Cam 60 projects from the rear end 24 for a distance of 20 centimeters. Cam 60 also supports a trip cam 64 depending downwardly therefrom along one side edge. See FIGS. 2 and 3. Cam 64 is adapted to contact a microswitch or the like on a traffic control device.

Referring particularly to FIG. 2, a drive wheel assembly 68 is secured to the bottom surface of the deck portion 16 adjacent the side wall 20. It will be noted that the assemblies 30 and 68 extend along opposite sides of the body 14. The assembly 68 includes a mounting plate 70 having transverse slots 72. A pair of threaded studs are welded to the bottom surface of deck portion 14 and extend through the slot 72. A nut 74 is threaded to each stud. The slots 72 facilitate adjustment of the assembly 68 toward and away from the assembly 30 so that it will be properly orientated with respect to a drive shaft on the track 12.

The drive wheel assembly 68 includes first and second drive wheels coupled together for oscillation about vertical axes through a limited arc of 45°. In FIG. 2, the drive wheels are in their drive position while in FIG. 4 they are in their accumulation or stop position.

A first drive wheel 78 is supported by a yoke 76. The yoke 76 is mounted for oscillation about a vertical axis through said arc of 45°. The drive wheel 78 rotates about a horizontal axis on its yoke 76.

A horizontally disposed flange 80 projects from the yoke 76. Flange 80 rotatably supports first and second cam followers designated 82, 84. The cam followers 82, 84 are below the elevation of the flange 80 as shown more clearly in FIG. 3.

The second drive wheel 88 is similarly supported on a yoke 86. A similar flange 90 projects from the yoke 86 and supports first and second cam followers 92, 94. The cam followers 92, 94 are above the elevation of flange 90. The flanges 80, 90 are at the same elevation so that only flange 80 is visible in FIG. 3.

The cam followers on the flanges 80, 90 perform the same function but cooperate with different structures as will be made clear hereinafter. The yokes 76, 86 are coupled together by a connecting member 96. Thus, each yoke has an extension pivotably connected to one end of the member 96. Member 96 is connected to a depending lug on the body 14 by way of a spring 98. Spring 98 biases the drive wheels to the drive positon as shown in FIG. 2. In the drive position, a portion of yoke 76 contacts adjustable limit stop 99.

A drive shaft 100 is supported in any convenient manner on track 12. Drive shaft 100 is preferably a plurality of drive shafts disposed end-to-end and aligned with one another at a location so as to be in frictional contact with the drive wheels 78, 80 in all positions of the drive wheels. At spaced points along the track 12, wherever it is desired to have traffic control, there is provided a traffic control device designated 102. The device 102 includes a cam having a cam surface at an elevation corresponding to the elevation of the cam followers 82, 84. See FIG. 3. The use of a pair of cam followers 82, 84 facilitates shortening the length of the cam surface on the device 102 to a linear distance of about 20–22 centimeters. Cam follower 84 contacts the cam surface on device 102 first, then both cam followers are in contact with the device 102, and thereafter only cam follower 82 contacts the device 102 when the vehicle is stopped as shown in FIG. 4.

The cam followers 92, 94 are at an elevation corresponding to the elevation of cam surface 62. If the vehicle 10 approaches a stationary vehicle along the track 12, contact between cam follower 94 and subsequent contact of cam follower 92 with the cam surface 62 on such other vehicle will cause vehicle 10 to accumulate. During such accumulation, the drive wheel assembly will be in the position as shown in FIG. 4 wherein the axes of the drive wheels 78, 88 are parallel to the longitudinal axis of the drive shaft 100.

Assembly time is minimized by preassembling each of the subassemblies 30, 68. Each of the assemblies may be adjusted toward and away from the other assembly to properly orientate the components of the assemblies with other structures such as the flange 54, cam surface 62, etc. If either assembly 30 or 68 is damaged, it can be easily replaced. The drive wheels 78, 88 perform the dual function of supporting one side of the body 14 and for propelling the body 14 by frictional contact with the drive shaft 100. It will be noted that the maximum width of the body 14 is defined by the distance across the side walls 18 and 20. All components are secured to the bottom surface of the deck portion 16 with only cam 60 and cam follower 94 projecting from opposite ends of the vehicle 10.

The rail 52 is at the elevation of a horizontal plane tangent to the top of drive shaft 10. The height of assemblies 30, 68 is substantially the same. Hence, deck portion 16 will be horizontally disposed even though there is only one rail. The drive shaft 100 acts as the second rail. Frictional contact between the drive shaft 100 and the drive wheels will vary directly with the load.

The vehicle 10 has a low profile, that is, below about 9 centimeters. The front and rear flanges 26, 28 will confine any load not secured to the deck portion 16 and will prevent it from falling off during starting or stopping of the vehicle 10. The cam followers 82, 84, 92, 94 are preferably made from ultra high molecular weight polyethylene for low wear. A line joining the axes of cam followers 82, 84 intersects an extension of the axis of wheel 78 to form an acute angle of 42°.

The present invention may be embodied in other specific forms without departing from the spirit or essential attributes thereof and, accordingly, reference should be made to the appended claims, rather than to the foregoing specification, as indicating the scope of the invention.

We claim:

1. A driverless vehicle comprising a body having opposite sides extending between a front end and a rear end, first and second sets of wheels on opposite sides for supporting said body so that a deck portion of the body is horizontally disposed, cam means projecting from one end of the body for causing accumulation in a manner wherein the body will stop without colliding with another body upon contact therewith, said first set of wheels being support wheels adapted to ride on a rail, drive wheels on mounts coupled together for oscillation between a drive position and a stop position, said drive wheels being biased to a drive position, said second set of wheels being said drive wheels, each drive wheel mount supporting a pair of cam followers which are rotatable about vertical axes at different distances from the associated drive wheel, the cam followers associated with one drive wheel being at a different elevation than the cam followers associated with the other drive wheel, the cam followers associated with the one drive wheel being adapted to cause the drive wheels to move toward a stop position upon contact with a cam, said drive wheels being adapted to perform the dual function of supporting their side of the body and for propelling the body by frictional contact with a drive shaft.

2. A vehicle in accordance with claim 1 wherein the drive wheel assemblies are coupled together by a connecting rod, and a spring extending between said rod and said body for biasing the drive wheels to their drive position.

3. A vehicle in accordance with claim 1 wherein the support wheels and drive wheels are at substantially the same elevation.

4. A vehicle in accordance with claim 3 wherein the drive wheels are supported by an inverted U-shaped member, said drive wheels being supported by a plate member, each of said members being secured to a bottom surface of the deck portion of the body.

5. A vehicle in accordance with claim 1 wherein said body is an inverted U-shape with the opposite sides of the body being defined by walls extending downwardly from said deck portion, and a discrete integral flange vertically disposed at the front and rear end of the body.

6. A vehicle in accordance with claim 1 wherein said cam means projects from said rear end for a distance of about 20 centimeters.

7. A vehicle in accordance with claim 1 including a fixed limit stop secured to a lower surface of said deck.

8. A vehicle in accordance with claim 1 wherein one of said cam followers which is the most remote from said cam means is at substantially the same elevation as said cam means so that is may be contacted by a corresponding cam means on another vehicle.

9. A low profile driverless vehicle comprising:
(a) a body made from sheet metal and having a horizontally disposed deck portion with side walls depending from opposite sides thereof, said body having an accumulation cam projecting from one end for causing accumulation in a manner wherein the body will stop without colliding with another body upon contact therewith,
(b) a support wheel subassembly including an inverted U-shaped carrier having its bight portion attached to a bottom surface of said deck portion adjacent one side wall of the body, said carrier rotatably supporting support wheels,
(c) a drive wheel subassembly secured to a bottom surface of said deck portion adjacent to the other side wall, the drive wheel subassembly including first and second drive wheels each having a mount, said mounts being coupled together for oscillation between a drive position and a stop position, each mount supporting at least one cam follower for causing the drive wheels to move toward a stop position upon contact with a traffic control cam,
(d) said subassemblies having substantially the same vertical height and being at substantially the same elevation, the cam follower on one mount being at an elevation different from the elevation of the cam follower on the other mount,
(e) said accumulation cam being attached to said body at an elevation corresponding to the elevation of one of said cam followers which is closest to the front end of the vehicle and closest to the elevation of the deck portion,
(f) said drive wheels being adapted to perform the dual function of supporting its side of the body and for propelling the body by frictional contact with a drive shaft, and
(g) said body supporting a pair of guide rollers for cooperating with a vertical guide.

10. A driveless vehicle comprising a body having opposite sides extending between a front and a rear end, first and second sets of wheels on said opposite sides for supporting said body so that a deck portion of the body is horizontally disposed, said first set of wheels being support wheels adapted to ride on a rail, drive wheel means adapted for oscillation between a drive position and stop position, said drive wheel means being biased to a drive position, said second set of wheels being said drive wheel means, each drive wheel means supporting a pair of cam followers which are rotatable about vertical axes at different distances from an associated drive wheel, the drive wheels being coupled together for movement as a unit, the lower periphery of the support wheels and drive wheels being at substantially the same elevation, one pair of cam followers being arranged for causing the drive wheel means to move toward a stop position upon contact with a cam, said drive wheel means being adapted to perform the dual function of supporting its side of the body and for propelling the body by frictional contact with a drive shaft.

11. A driverless vehicle comprising a body having support wheels and at least one drive wheel, said drive wheel having a movable mount, means connected to said mount for shortening the length of a cam surface adapted to move said mount, said means including two cam followers rotatable about vertical axes at different distances from said drive wheel for sequential contact with a cam.

12. A vehicle in accordance with claim 11 wherein the body has a top surface whose size is between 1500 and 5000 $cm^2$ for carrying loads less than about 100 Kg, and said cam followers being arranged to stop the vehicle over a distance not more than about 22 cm.

13. A vehicle in accordance with claim 11 including a pair of drive wheels supported by said body, each drive wheel having two cam followers, the cam followers associated with one drive wheel being at a different elevation from the cam followers on the other drive wheel.

14. A vehicle in accordance with claim 11 wherein said drive wheel is rotatable about a horizontal axis, an extension of said axis intersecting a line joining the axes of said cam followers so as to form an acute angle.

15. A vehicle in accordance with claim 14 wherein said acute angle is about 42°.

* * * * *